March 29, 1960  B. M. S. KALLING ET AL  2,930,688
METHOD OF REFINING SILICON CONTAINING PIG
IRON WITH OXYGEN IN A ROTARY FURNACE
Filed Feb. 3, 1958  2 Sheets-Sheet 1

United States Patent Office 2,930,688
Patented Mar. 29, 1960

2,930,688

METHOD OF REFINING SILICON CONTAINING PIG IRON WITH OXYGEN IN A ROTARY FURNACE

Bo Michael Sture Kalling, Domnarvet, and Folke Karl Evald Johansson, Hallsjogarden Borlange, Sweden, assignors to Stora Kopparbergs Bergslags Aktiebolag, Falun, Sweden Application February 3, 1958, Serial No. 712,899

Claims priority, application Sweden February 8, 1957

7 Claims. (Cl. 75—52)

The invention relates to the process of refining silicon containing pig iron with oxygen in a rotary furnace, and it is one of the objects of the invention to reduce iron losses.

In refining silicon containing pig iron with oxygen gas blown from above against or into the bath it has proved difficult to avoid the formation of a violently foaming, viscous slag which fills up the furnace chamber and sometimes flows out of the furnace opening. This may make it highly difficult to carry out the process. This slag contains, in addition to silica formed in the process by oxidation, a certain percentage of lime from materials added before or during the course of the blow. The addition of lime must be so large that the attack of the silica on the usually basic furnace lining in sufficiently counteracted. Thereby the amount of slag will become considerable, especially at higher silicon contents in the pig iron. Since, furthermore, the iron content of the slag usually becomes large, a considerable loss of iron is incurred in this way during the blow.

The present invention relates to a process through which these inconveniences can be avoided. It has been found that in performing the refining in a rotating furnace with a horizontal or inclined axis, for instances, according to the U.S. Patent No. 2,598,393 and the U.S. patent application No. 549,220, now Patent No. 2,853,377, issued September 23, 1958, the process can be run without any disturbances and with a very high iron yield by drawing off a pre-slag at a suitable stage of the process even if the pig iron is rich in silicon and possibly simultaneously rich in phosphorus.

This tapping of a pre-slag is carried out when the major part of the silicon content of the pig iron has been oxidized. By giving the slag a suitable composition and adjusting the temperature to a proper level, as will be explained hereinbelow, it has turned out to be possible to bring down the iron percentage in the pre-slag to a value below about 2% even if large quantities of iron ore have been added as cooling agent together with lime during the first stage of the blow. The composition of the slag may, in principal, be similar to that of a normal blast furnace slag. It should be basic enough to counteract the attack on the furnace lining but the silica content must, on the other hand, be large enough to make the slag sufficiently fluid. From these points of view it has turned out to be advisable to maintain the ratio $$\frac{CaO + MgO}{SiO_2}$$

in the slag between 1.0 and 2.0, preferably between 1.2 and 1.6. The slag will then become so fluid that it can be tapped practically completely at a comparatively low temperature which is desirable in order to prevent a higher degree of carbon oxidation before the silicon content is practically completely oxidized. If a more serious oxidizing of carbon occurs before the tapping of the slag, the latter starts to foam and the iron content in the slag will simultaneously rise rapidly. When tapping the slag the temperature ought to mount to about 1500° C. and should not exceed about 1550° C. For the desired low iron content in the slag to be obtained, a vigorous stirring of the bath should take place which makes a relatively high rotation speed of the furnace desirable. Said speed should suitably exceed about 5 revolutions per minute and preferably amount to at least 10 and in some cases at least 15 revolutions per minute. The peripheral speed of the furnace should exceed 0.5 and preferably 1 meter per second.

A slag withdrawal of this kind has turned out to involve considerable advantages as soon as the silicon content of the pig iron exceeds about 0.5%. When tapping the pre-slag the silicon content should preferably have been brought down to 0.1% or less, but the initial blowing may be interrupted at higher Si contents up to 0.3%, with a result that is substantially satisfactory.

In refining a pig iron poor in phosphorus only the carbon content remains after the tapping of the pre-slag besides part of the manganese possibly present in the pig iron. Hence, the quantity of slag required for the following blowing action will become comparatively low, especially if the necessary cooling is performed by means of scrap iron or with iron ore having a low percentage of impurities. At least to begin with the carbon refining can be carried through without the formation of any molten slag. Whether the slag melts or not depends on the quantity of lime added during this blowing period and further also on the rotation speed of the furnace. At a lime content large enough and a sufficient rotation speed (preferably over 10 revolutions per minute) so as to bring down the iron content, the slag may remain dry right until the desired percentage of carbon is obtained in the steel. This may be a considerable advantage as a dry slag only inconsiderably attacks the furnace lining. If the slag contains more than about 15–20% silica it is generally no longer possible to maintain it dry or viscous enough, which still more emphasizes the importance of tapping the silica containing slag at an early stage.

The comparatively small amount of slag which is obtained during the final blowing normally contains, however, a relatively large percentage of iron. In order to recover this iron and also utilize the lime content, the slag may to advantage at least partly be used as a cooling medium during the first stage of a succeeding blow. The iron loss incurring by slag during the blowing may then be limited to that iron which is drawn off together with the pre-slag. If this slag, for instance, comprises 10% of the weight of the pig iron and contains 2% iron, the total iron loss will only be 0.2% of the weight of the pig iron, which is only a small fraction of the loss incurring in normal processes of this kind in which no tapping of pre-slag is made.

If the pig iron, in addition to silicon, also contains a large percentage of phosphorus, for instance over 0.5% P, it might be desirable to carry out a second slag tapping after the major part of the phosphorus has also been oxidized in a manner known per se, for instance, as described more in detail in thte U.S. patent application No. 676,303.

The process will now be described more in detail with reference to an example of how to refine a low phosphorus silicon containing pig iron in a rotary furnace illustrated in the accompanying drawing, in which.

Figure 1:
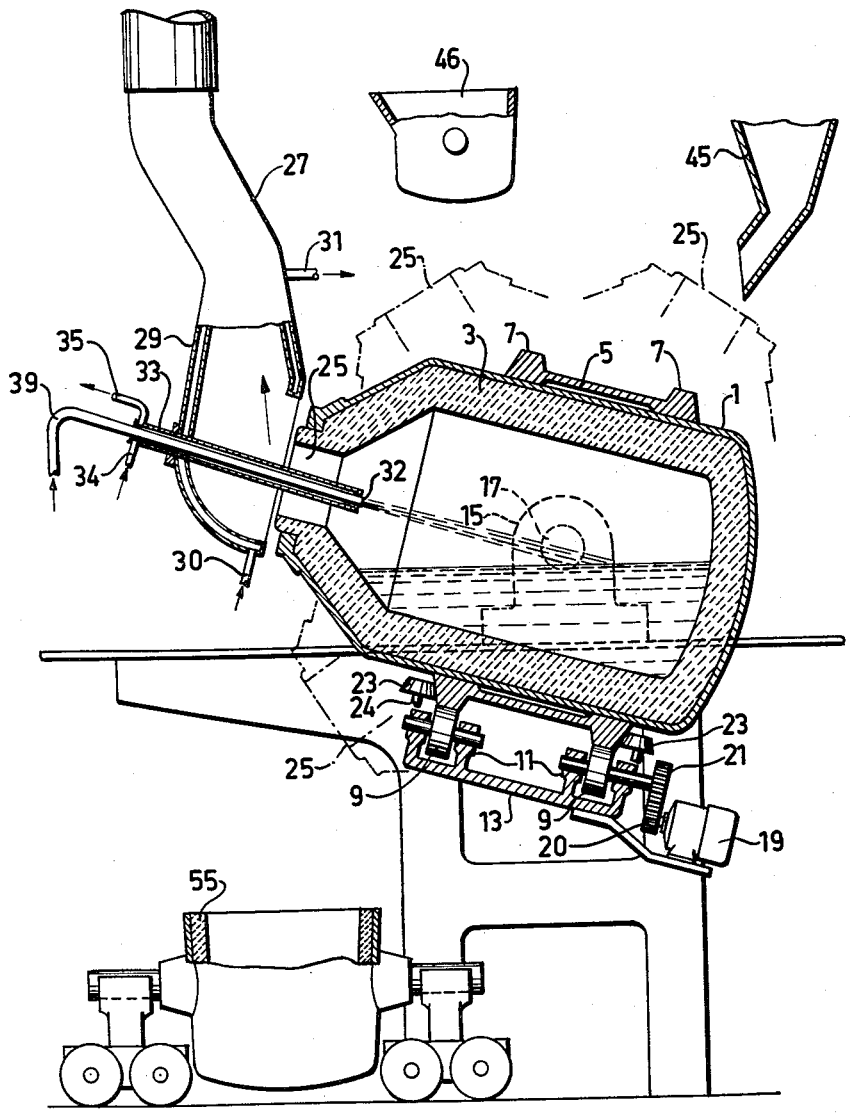
Fig. 1 shows a tippable rotary furnace.

The rotary furnace 1 comprises a metallic shell having an interior lining 3 and is fitted in a supporting ring 5 having two treads 7. At the rotation of the furnace each tread travels on a set of rollers 9 journalled in bearings 11 secured to the cradle 13 which is mounted in bearings 15 by pivoting shafts 17 so that the whole furnace can be tipped in different positions suitable for charging and tapping as well as for the heat treatment. One of the rollers 9 is driven by a motor 19 over cog wheels 20, 21. Retainer rollers 23 pivoted about pins 24 are provided on the cradle so as to engage treading portions of ring 5 for preventing the furnace from axial dislocation upon tipping. The furnace has a single opening 25 located at the centre of one end wall. An exhaust gas hood 27 is located with a clearance of about 1 decimeter in front of this opening, when the furnace is in position for the heat treatment at an inclination of, for instance, 15–20°. The hood is provided with a cooling jacket 29 having water inlet 30 and outlet 31. Mounted in the hood is a blast twyer 33 watercooled as indicated by water inlet 34 and outlet 35. Gas rich in oxygen is supplied to the pipe 32 of twyer 33 through the flexible hose 39. The furnace can, as indicated in the drawing, be tipped into one position for charging slag forming material, usually lime, and iron ore through funnel 45 and into another position for charging molten pig iron through ladle 46 and also into a position for tapping into a movable ladle 55.

A rotatable furnace of the design shown in Fig. 1 and having a capacity of 30 metric tons, was charged with 750 kilograms of burnt lime and 660 kilograms of ore together with 27,800 kilograms of molten pig iron of the following analysis: C=3.82%, Si=0.75%, Mn=0.76%, P=0.090%, S=0.059%.

After the charging, oxygen gas with an oxygen content of 97% was blown in with a speed of 50 normal cubic meters per minute. The oxygen gas was supplied to the space above the surface of the bath by way of a twyer forming an angle of 23° with the surface of the bath, and the furnace was rotated with 30 revolutions per minute in order to provide an intimate mixture of pig iron and slag. After a blowing period of 7½ minutes the supply of oxygen gas was cut off but the rotation was continued during another half minute so as to obtain a low iron content in the slag.

Figure 2:
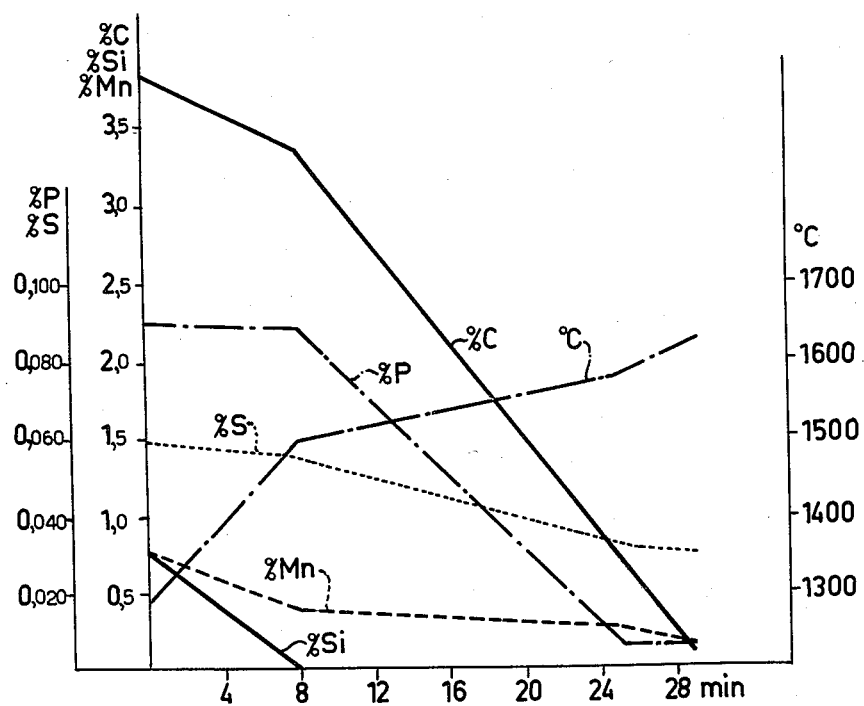
Fig. 2 is a diagram showing some main data of the course of a refining heat.

After this refining period, as will be seen in Fig. 2, most of the silicon content of the pig iron had been oxidized so that the content had decreased to 0.02% and the temperature had risen from 1290° to 1500° C. The silicate slag obtained was of good fluidity and the major part thereof could be tapped out of the furnace. The slag had the following composition: $SiO_2$=36.8%, CaO=42.4%, MgO=7.5%, Fe=2.1%, S=0.165%.

The composition of the pig iron at the moment the pre-slag was tapped is shown in Fig. 2.

After the tapping of the pre-slag further 1,000 kilograms of lime and 2,530 kilograms of ore were added and then the carbon was oxidized to a content of 0.66% in 17 minutes. An interruption was then made for checking the carbon content and the steel temperature (1580° C.).

At this occassion the slag was not molten due to a low content of iron oxides and silica. After the addition of another quantity of 165 kilograms of ore the charge was finally blown during 4 minutes to 0.09% C. and a steel temperature of 1625°. Now the slag was molten again and had the following composition: SiO=15.7%, CaO=44.3%, MgO=11.8%, Fe=14.9%, S=0.222%.

After tapping this slag and the steel obtained the slag was returned to the furnace, replacing part of the ore and lime that had to be charged together with the pig iron when the process was started as stated above.

The pre-blowing described in the above example or in any other pre-blowing according to the present invention, may, of course, be employed also in case it is desired to subject the pig iron obtained at the stage of the tapping of pre-slag to other treatment than steel-making in the same furnace. For instance, the pig iron still rich in carbon but having low percentage of silicon may be tapped and be granulated and, if desired, be dry refined, or it may be transferred to furnace for refining according to any suitable conventional steel making process.

What is claimed is:

1. In the method of purifying pig iron rich in silicon by a two-stage operation in the first stage of which a molten body of such pig iron is established in a reaction chamber of substantially circular cross-section, said chamber being rotatable about its axis perpendicular to such cross-section, at least partially covering said body with an initial slag composition, blowing oxygen gas to the surface of said body, while rotating said chamber, for a period of time and tapping off the resulting first slag, and in the second stage of which new slag constituents are added and the blowing continued until the desired degree of refining is attained, the improved procedure for minimizing iron losses in said first slag characterized in that the first slag is given such a composition that when tapped the ratio of $(CaO+MgO):SiO_2$ in the same is between 1 and 2, vigorously stirring the contents of the chamber during the blow, maintaining the temperature of the melt throughout the first stage at a value not exceeding 1550° C., and tapping off said first slag when the silicon content of the iron melt has been decreased to a value below 0.3 percent.

2. The improved method defined in claim 1, in which the rotation speed of the chamber, at least towards the end of the period before the tapping of said first slag, amounts to at least 5 revolutions per minute.

3. The improved method defined in claim 2, in which the rotation speed of the chamber, at least towards the end of the period before the tapping of said first slag, amounts to at least 10 revolutions per minute.

4. The improved method defined in claim 1, in which said blowing of oxygen is interrupted a short while before the rotation is stopped for tapping said first slag.

5. The improved method defined in claim 1, in which said blowing is continued after said tapping of said first slag, and slag forming material including line material, and iron-containing cooling material are added to said bath, the quantity and composition of said added materials being such that the $SiO_2$ content of the second slag will be below 20% during the main period of the final blow.

6. The improved method defined in claim 5, in which the quantity and composition of said added materials are such that the $SiO_2$ content of the second slag will be below 15% during the main period of the final blow.

7. The improved method defined in claim 5, in which the first slag is given such a composition that when tapped the ratio of $(CaO+MgO):SiO_2$ is between 1.2 and 1.6.

References Cited in the file of this patent

UNITED STATES PATENTS

| | | |
|---|---|---|
| 416,814 | Twynam | Dec. 10, 1889 |
| 879,480 | Maltitz | Feb. 18, 1908 |
| 2,598,393 | Kalling et al. | May 27, 1952 |

UNITED STATES PATENT OFFICE

CERTIFICATE OF CORRECTION

Patent No. 2,930,688            March 29, 1960

Bo Michael Sture Kalling et al.

It is hereby certified that error appears in the printed specification of the above numbered patent requiring correction and that the said Letters Patent should read as corrected below.

Column 4, line 46, for "line" read -- lime --.

Signed and sealed this 23rd day of August 1960.

(SEAL)
Attest:

KARL H. AXLINE            ROBERT C. WATSON
Attesting Officer            Commissioner of Patents